US010308898B2

(12) United States Patent
Sworen et al.

(10) Patent No.: US 10,308,898 B2
(45) Date of Patent: *Jun. 4, 2019

(54) METHOD OF IMPARTING WATER REPELLENCY WITH NON-FLUORINATED LAUNDRY TREATMENT COMPOSITIONS

(71) Applicant: THE CHEMOURS COMPANY FC LLC, Wilmington, DE (US)

(72) Inventors: John Christopher Sworen, Chadds Ford, PA (US); Gerald Oronde Brown, Wilmington, DE (US); Sara Lyons, New Castle, DE (US); Ewa Kohler, West Chester, PA (US)

(73) Assignee: THE CHEMOURS COMPANY FC, LLC, Wilmington, DE (US)

(*) Notice: Subject to any disclaimer, the term of this patent is extended or adjusted under 35 U.S.C. 154(b) by 339 days.

This patent is subject to a terminal disclaimer.

(21) Appl. No.: 14/851,484

(22) Filed: Sep. 11, 2015

(65) Prior Publication Data

US 2016/0090560 A1 Mar. 31, 2016

Related U.S. Application Data

(60) Provisional application No. 62/055,923, filed on Sep. 26, 2014.

(51) Int. Cl.
*C08G 18/00* (2006.01)
*C11D 3/32* (2006.01)
*C09D 175/08* (2006.01)
*C09D 175/06* (2006.01)
*C11D 3/00* (2006.01)
*D06M 13/144* (2006.01)
*C11D 3/37* (2006.01)
*D06M 15/564* (2006.01)
*D06M 15/568* (2006.01)
*D06M 15/572* (2006.01)
*C11D 3/34* (2006.01)
*C08G 18/70* (2006.01)
*C08G 18/75* (2006.01)
*C08G 18/28* (2006.01)
*C08G 18/78* (2006.01)
*C08G 18/32* (2006.01)
*C08G 18/73* (2006.01)
*C08G 18/79* (2006.01)
*C08G 18/36* (2006.01)

(52) U.S. Cl.
CPC ............ *C11D 3/323* (2013.01); *C09D 175/06* (2013.01); *C09D 175/08* (2013.01); *C11D 3/0005* (2013.01); *C11D 3/0036* (2013.01); *C11D 3/32* (2013.01); *C11D 3/349* (2013.01); *C11D 3/3726* (2013.01); *D06M 13/144* (2013.01); *D06M 15/564* (2013.01); *D06M 15/568* (2013.01); *D06M 15/572* (2013.01); *C08G 18/281* (2013.01); *C08G 18/283* (2013.01); *C08G 18/284* (2013.01); *C08G 18/3221* (2013.01); *C08G 18/36* (2013.01); *C08G 18/706* (2013.01); *C08G 18/73* (2013.01); *C08G 18/755* (2013.01); *C08G 18/7831* (2013.01); *C08G 18/792* (2013.01); *C11D 3/3454* (2013.01); *D06M 2200/12* (2013.01)

(58) Field of Classification Search
CPC .. C08G 18/281; C08G 18/283; C08G 18/284; C08G 18/3221; C08G 18/36; C08G 18/706; C08G 18/73; C08G 18/755; C08G 18/7831; C08G 18/792; C11D 3/323; C11D 3/0005; C11D 3/0036; C11D 3/32; C11D 3/349; C11D 3/3726; D06M 13/425; D06M 15/564; D06M 15/568

See application file for complete search history.

(56) References Cited

U.S. PATENT DOCUMENTS

| | | | |
|---|---|---|---|
| 3,049,513 A | 8/1962 | Damusis | |
| 3,505,001 A | 4/1970 | Wagner | |
| 4,304,683 A | 12/1981 | Morinaka et al. | |
| 4,360,447 A | 11/1982 | Morinaka et al. | |
| 4,388,372 A | 6/1983 | Champaneria et al. | |
| 5,041,467 A * | 8/1991 | Kataoka | C08G 18/0804 521/159 |
| 5,910,557 A * | 6/1999 | Audenaert | C08G 18/2805 252/8.62 |

(Continued)

FOREIGN PATENT DOCUMENTS

| | | |
|---|---|---|
| CN | 101914185 A | 12/2010 |
| EP | 2415879 | 8/2010 |

(Continued)

OTHER PUBLICATIONS

International Search Report and Written Opinion, PCT/US2015/049628, dated Dec. 8, 2015.

(Continued)

*Primary Examiner* — Michael L Leonard

(57) ABSTRACT

The present invention discloses a method of imparting water repellency and optionally stain release to fibrous substrates by contacting a fibrous substrate with a non-fluorinated laundry treatment composition inside a laundry machine. The laundry treatment composition contains a hydrophobic organic urethane compound having a urethane linkage and the residue of a substituted cyclic or acyclic sugar alcohol. Laundry additive compositions containing a first laundry treatment composition, having a hydrophobic organic urethane compound, and a second laundry treatment composition are also included.

14 Claims, No Drawings

(56) References Cited

U.S. PATENT DOCUMENTS

| | | |
|---|---|---|
| 6,864,312 B2 | 3/2005 | Moore |
| 7,344,758 B2 | 3/2008 | Franchina et al. |
| 8,349,986 B2 | 1/2013 | Rukavina et al. |
| 8,586,697 B2 | 11/2013 | Elizalde et al. |
| 2003/0120101 A1 | 6/2003 | Lai |
| 2004/0010858 A1* | 1/2004 | Detering ............... C11D 3/3726 8/115.51 |
| 2005/0085573 A1* | 4/2005 | Sandner ............. C08G 18/3281 524/196 |
| 2006/0052556 A1 | 3/2006 | Franchina et al. |
| 2006/0151739 A1 | 7/2006 | Sandner et al. |
| 2006/0188729 A1* | 8/2006 | Schubert ............ C08G 18/0823 428/423.1 |
| 2007/0009663 A1 | 1/2007 | Wang et al. |
| 2007/0167601 A1 | 7/2007 | Rukavina et al. |
| 2008/0143491 A1 | 6/2008 | Van Buskirk et al. |
| 2008/0146750 A1 | 6/2008 | Corn et al. |
| 2010/0124649 A1 | 5/2010 | Rukavina et al. |
| 2010/0190397 A1 | 7/2010 | Duschek et al. |
| 2013/0238066 A1 | 10/2013 | Reiners et al. |
| 2014/0031483 A1 | 1/2014 | Elizalde et al. |
| 2014/0295724 A1 | 10/2014 | Sworen et al. |

FOREIGN PATENT DOCUMENTS

| | | |
|---|---|---|
| GB | 887387 | 1/1962 |
| GB | 1360007 | 7/1974 |
| JP | 1972003477 B | 1/1972 |
| JP | 1973004940 | 1/1973 |
| JP | 1983079008 | 5/1983 |
| JP | 1985045678 B2 | 10/1985 |
| JP | 05331130 A | 12/1993 |
| KR | 2009002894 A1 | 1/2009 |
| WO | 200037525 A1 | 6/2000 |
| WO | 2003089477 A1 | 10/2003 |
| WO | 2006024669 A1 | 3/2006 |
| WO | 2006040333 A1 | 4/2006 |
| WO | 2009015136 A1 | 1/2009 |
| WO | 2011124710 A | 10/2011 |
| WO | 2014160905 A1 | 10/2014 |
| WO | 2014160906 A2 | 10/2014 |

OTHER PUBLICATIONS

Mao et al., Effect of additives on microstructure and properties of polyurethane coating film for fabrics, Fangzhi Xuebao (1996), 17(2), 4-7 (Abstract attached).

Ethox Chemicals Products Brochure, 2006, pp. 1-18.

\* cited by examiner

METHOD OF IMPARTING WATER REPELLENCY WITH NON-FLUORINATED LAUNDRY TREATMENT COMPOSITIONS

FIELD OF INVENTION

This invention relates to a method of imparting water repellency and optionally stain release to fibrous substrates by contacting a fibrous substrate with a laundry treatment composition inside a laundry machine.

BACKGROUND OF THE INVENTION

Various compositions are known to be useful as treating agents to provide water repellency and optionally stain release to textile substrates. Most textile treatments require industrial baths and curing equipment. Many such treating agents are fluorinated polymers and copolymers, or non-fluorinated polymers and copolymers. Non-fluorinated compounds are predominately polyacrylate-based or urethane-based copolymers.

Fluorinated copolymers provide good repellency to water and oil. Such polymer compositions are commonly applied and cured at a fabric mill by industrial methods. Various attempts have been made to produce a non-fluorinated water repellent, but previous non-fluorinated repellent compounds have been less effective than the fluorinated counterparts.

Moore, in U.S. Pat. No. 6,864,312, discloses a polyurethane polymer that provides moisture resistance. Moore claims polyurethane polymer particle dispersions, where the polyurethane polymers are isocyanate-terminated prepolymers prepared from a formulation including a polyisocyanate and a polyol.

SUMMARY OF INVENTION

The need exists for a facile method of providing durable water repellency and optionally stain release to a fibrous substrate in a home, laundering facility, or other small-scale setting, using common laundering equipment. Also desirable is a laundry treatment composition that provides similar or equivalent water repellency performance to fluorinated compositions that have been industrially applied to a fibrous substrate. The present invention meets these needs.

The present invention comprises a method of imparting water repellency and optionally stain release to fibrous substrates by contacting a fibrous substrate with a non-fluorinated laundry treatment composition inside a laundry machine. The laundry treatment composition comprises a hydrophobic organic urethane compound, the compound derived from isocyanates and modified sugar alcohols. Laundry additive compositions comprising a first laundry treatment composition, comprising a hydrophobic organic urethane compound, and a second laundry treatment composition are also included.

The present invention relates to a method of imparting water repellency and optionally stain release to fibrous substrates comprising contacting a fibrous substrate with a laundry treatment composition inside a laundry machine,
wherein the laundry treatment composition comprises a hydrophobic compound having at least one linkage of Formula I:

—NHC(O)—X—      (I)

wherein
X is the residue of a cyclic or acyclic sugar alcohol which is substituted with at least one —R$^1$; —C(O)R$^1$; —(CH$_2$CH$_2$O)$_n$(CH(CH$_3$)CH$_2$O)$_m$R$^2$; —(CH$_2$CH$_2$O)$_n$(CH(CH$_3$)CH$_2$O)$_m$C(O)R$^1$; or mixtures thereof;
where the cyclic or acyclic sugar alcohol is selected from a saccharide, reduced sugar, aminosaccharide, aldonic acid, or aldonic acid lactone;
wherein
each n is independently 0 to 20;
each m is independently 0 to 20;
m+n is greater than 0;
each R$^1$ is independently a linear or branched alkyl group having 5 to 29 carbons optionally comprising at least 1 unsaturated bond; and
each R$^2$ is independently —H or a linear, branched alkyl group having 6 to 30 carbons optionally comprising at least 1 unsaturated bond, or mixtures thereof.

The present invention also relates to a laundry additive composition comprising a first laundry treatment composition and a second laundry treatment composition which is different than the first laundry treatment composition, where the first laundry treatment composition comprises a hydrophobic compound having at least one linkage of Formula I as defined above.

DETAILED DESCRIPTION OF INVENTION

Herein all trademarks are designated with capital letters.

The present invention comprises a method of imparting water repellency and optionally stain release to fibrous substrates by contacting a fibrous substrate with a non-fluorinated laundry treatment composition inside a laundry machine. Such a method provides the user the ability to enhance the performance and durability of water repellency to substrates, comparable to traditional industrially-applied fluorinated commercially available treatment agents, in a home, laundry facility, or other small-scale setting with the use of a laundry machine.

The present invention relates to a method of imparting water repellency and optionally stain release to fibrous substrates comprising contacting a fibrous substrate with a laundry treatment composition inside a laundry machine, wherein the laundry treatment composition comprises a hydrophobic compound having at least one linkage of Formula (I):

—NHC(O)—X—      (I)

wherein X is the residue of a cyclic or acyclic sugar alcohol which is substituted with at least one —R$^1$; —C(O)R$^1$; —(CH$_2$CH$_2$O)$_n$(CH(CH$_3$)CH$_2$O)$_m$R$^2$; —(CH$_2$CH$_2$O)$_n$(CH(CH$_3$)CH$_2$O)$_m$C(O)R$^1$; or mixtures thereof; where the cyclic or acyclic sugar alcohol is selected from a saccharide, reduced sugar, aminosaccharide, aldonic acid, or aldonic acid lactone; wherein each n is independently 0 to 20; each m is independently 0 to 20; m+n is greater than 0; each R$^1$ is independently a linear or branched alkyl group having 5 to 29 carbons optionally comprising at least 1 unsaturated bond; and each R$^2$ is independently —H, a linear or branched alkyl group having 6 to 30 carbons optionally comprising at least 1 unsaturated bond, or mixtures thereof. The term "residue of a cyclic or acyclic sugar alcohol" is herein defined as the molecular structure of a cyclic or acyclic sugar alcohol when one or more H atoms has been removed from a hydroxyl group —OH. In Formula (I), the bond of X to —NHC(O)— forms a urethane functional group. The urethane functional group may be formed by any suitable method, including by reacting an isocyanate, diisocyanate, or polyisocyanate with a cyclic or acyclic sugar alcohol which is substituted with at least one —R$^1$; —C(O)

$R^1$; —$(CH_2CH_2O)_n(CH(CH_3)CH_2O)_mR^2$; —$(CH_2CH_2O)_n(CH(CH_3)CHO)_mC(O)R^1$; or mixtures thereof.

Preferably, the final compound contains 0% to about 1% of reactive isocyanate groups. When optimum durable water repellency is desired, the linkage of Formula (I) composes 80 to 100% by mol of the total urethane linkages in the hydrophobic compound. In another embodiment, the linkage of Formula (I) composes 90 to 100% by mol of the total urethane linkages in the hydrophobic compound. In a third embodiment, the linkage of Formula (I) composes 95 to 100% by mol of the total urethane linkages in the hydrophobic compound. In one embodiment, the molecular weight of the final compound is at least 10,000 g/mol.

The cyclic or acyclic sugar alcohol is selected from a saccharide, reduced sugar, aminosaccharide, aldonic acid, or aldonic acid lactone, and is substituted with at least one —$R^1$; —$C(O)R^1$; —$(CH_2CH_2O)_n(CH(CH_3)CH_2O)_mR^2$; —$(CH_2CH_2O)_n(CH(CH_3)CH_2O)_mC(O)R^1$; or mixtures thereof. Such a substitution lends hydrophobic character to the monomer, and to the polymer molecules. In one embodiment, the cyclic or acyclic sugar alcohol is substituted with at least two —$R^1$; —$C(O)R^1$; —$(CH_2CH_2O)_n(CH(CH_3)CH_2O)_mR^2$; —$(CH_2CH_2O)_n(CH(CH_3)CH_2O)_mC(O)R^1$; or mixtures thereof; and in another embodiment, it is substituted with at least three —$R^1$; —$C(O)R^1$; —$(CH_2CH_2O)_n(CH(CH_3)CH_2O)_mR^2$; —$(CH_2CH_2O)_n(CH(CH_3)CH_2O)_mC(O)R^1$; or mixtures thereof. Examples of such sugar alcohols include but are not limited to aldoses and ketoses such as those compounds derived from tetroses, pentoses, hexoses, and heptoses. Specific examples include glucose, glyceraldehyde, erythrose, arabinose, ribose, arabinose, allose, altrose, mannose, xylose, lyxose, gulose, glactose, talose, fructose, ribulose, mannoheptulose, sedohelptulose, threose, erythritol, threitol, glucopyranose, mannopyranose, talopyranose, allopyranose, altropyranose, idopyranose, gulopyranose, glucitol, mannitol, erythritol, sorbitol, arabitol, xylitol, ribitol, galactitol, fucitol, iditol, inositol, pentaerythritol, dipentaerythritol, volemitol, gluconic acid, glyceric acid, xylonic acid, galactaric acid, ascorbic acid, citric acid, gluconic acid lactone, glyceric acid lactone, xylonic acid lactone, glucosamine, galactosamine, or mixtures thereof.

The cyclic or acyclic sugar alcohols are substituted with at least one —$R^1$; —$C(O)R^1$; —$(CH_2CH_2O)_n(CH(CH_3)CH_2O)_mR^2$; or —$(CH_2CH_2O)_n(CH(CH_3)CH_2O)_mC(O)R^1$ by any suitable method, including esterification with a fatty acid, to form hydroxyl-functional substituted sugar alcohols. In one embodiment, the fatty acid substitution of the cyclic or acyclic sugar alcohols has a melting point of at least −59° C. In another embodiment, the fatty acid substitution of the cyclic or acyclic sugar alcohols has a melting point of at least 0° C., and in a third embodiment, the fatty acid substitution of the cyclic or acyclic sugar alcohols has a melting point of at least 40° C. Suitable fatty acids include, but are not limited to, caprylic acid, capric acid, lauric acid, mysteric acid, palmitic acid, stearic acid, arachidic acid, behenic acid, lignoceric acid, palmitoleic acid, lineolic acid, oleic acid, erucic acid, and mixtures thereof. In one embodiment, $R^1$ is a linear or branched alkyl group having 11 to 29 carbons, and in another embodiment, $R^1$ is a linear or branched alkyl group having 17 to 21 carbons. In one embodiment, $R^2$ is a linear or branched alkyl group having 12 to 30 carbons, in another embodiment, $R^2$ is a linear or branched alkyl group having 18 to 30 carbons, and in another embodiment, $R^2$ is a linear or branched alkyl group having 18 to 22 carbons.

In one embodiment, X is selected from Formulas (IIa), (IIb), or (IIc):

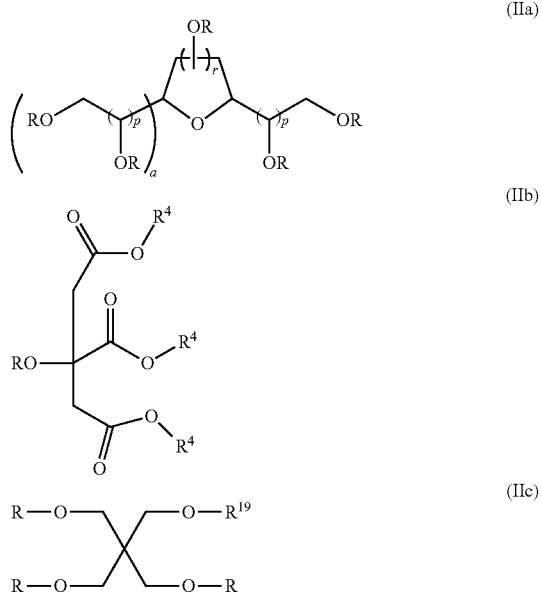

wherein each R is independently a direct bond to NHC(O) of Formula I; —H; —$R^1$; —$C(O)R^1$; —$(CH_2CH_2O)_n(CH(CH_3)CH_2O)_mR^2$; or —$(CH_2CH_2O)_n(CH(CH_3)CH_2O)_mC(O)R^1$; each n is independently 0 to 20; each m is independently 0 to 20; m+n is greater than 0; r is 1 to 3; a is 0 or 1; p is independently 0 to 2; provided that a is 0 when r is 3; each $R^1$ is independently a linear or branched alkyl group having 5 to 29 carbons optionally comprising at least 1 unsaturated bond; each $R^2$ is independently —H, or a linear or branched alkyl group having 6 to 30 carbons optionally comprising at least 1 unsaturated bond; or a mixture thereof, provided when the compound is Formula (IIa), then at least one R is a direct bond to NHC(O) of Formula 1; and at least one R is a —$R^1$; —$C(O)R^1$; —$(CH_2CH_2O)_n(CH(CH_3)CH_2O)_mR^2$; or —$(CH_2CH_2O)_n(CH(CH_3)CH_2O)_mC(O)R^1$; each $R^4$ is independently a direct bond to NHC(O) of Formula I; —H, a linear or branched alkyl group having 6 to 30 carbons optionally comprising at least 1 unsaturated bond, or combinations thereof; —$(CH_2CH_2O)_n(CH(CH_3)CH_2O)_mR^2$; or —$(CH_2CH_2O)_n(CH(CH_3)CH_2O)_mC(O)R^1$; provided when the compound is Formula (IIb), then at least one R or $R^4$ is a direct bond to NHC(O) of Formula 1; and at least one R or $R^4$ is a linear or branched alkyl group optionally comprising at least 1 unsaturated bond, or combinations thereof; —$(CH_2CH_2O)_n(CH(CH_3)CH_2O)_mR^2$; or —$(CH_2CH_2O)_n(CH(CH_3)CH_2O)_mC(O)R^1$; and each $R^{19}$ is a direct bond to NHC(O) of Formula I; —H, —$C(O)R^1$, or —$CH_2C[CH_2OR]_3$, provided when the compound is Formula (IIc), then at least one $R^{19}$ or R is a direct bond to NHC(O) of Formula I; and at least one $R^{19}$ or R is —$C(O)R^1$, —$(CH_2CH_2O)_n(CH(CH_3)CH_2O)_mR^2$; or —$(CH_2CH_2O)_n(CH(CH_3)CH_2O)_mC(O)R^1$.

In Formulas (IIa), (IIb), or (IIc), the —$(CH_2CH_2O)$— represents oxyethylene groups (EO) and —$(CH(CH_3)CH_2O)$— represents oxypropylene groups (PO). These compounds can contain only EO groups, only PO groups, or mixtures thereof. These compounds can also be present as a tri-block copolymer designated PEG-PPG-PEG (polyethylene glycol-polypropylene glycol-polyethylene glycol), for example.

Where X is Formula (IIa), any suitable substituted reduced sugar alcohol may be employed, including esters of 1,4-sorbitan, esters of 2,5-sorbitan, and esters of 3,6-sorbitan. In one embodiment, X is selected from Formula (IIa) to be Formula (IIa'):

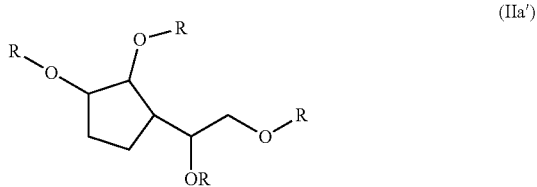

(IIa')

wherein R is further limited to independently a direct bond to NHC(O), —H; —$R^1$; or —C(O)$R^1$. In one embodiment, at least one R is —C(O)$R^1$ or $R^1$. Compounds used to form residues of Formula (IIa'), having at least one of R is —H and at least one R is selected from —C(O)$R^1$, are commonly known as alkyl sorbitans. These sorbitans can be mono-substituted, di-substituted, or tri-substituted with —C(O)$R^1$. It is known that commercially available sorbitans, such as SPAN, contain a mixture of the various sorbitans ranging from where each R is H (un-substituted), and sorbitans where each R is —C(O)$R^1$ (fully substituted); wherein $R^1$ is a linear or branched alkyl group having 5 to 29 carbons; and mixtures of various substitutions thereof. The commercially available sorbitans may also include amounts of sorbitol, isosorbide, or other intermediates or byproducts.

In one embodiment, at least one R is —C(O)$R^1$, and $R^1$ is a linear branched alkyl group having 5 to 29 carbons. In another embodiment, $R^1$ is a linear or branched alkyl group having 7 to 21 carbons, and in a third embodiment, $R^1$ is a linear or branched alkyl group having 11 to 21 carbons. Preferred compounds used to form these residues include mono-, di-, and tri-substituted sorbitans derived from caprylic acid, capric acid, lauric acid, mysteric acid, palmitic acid, stearic acid, arachidic acid, behenic acid, lignoceric acid, and mixtures thereof. Particularly preferred compounds used to form X include mono-, di-, and tri-substituted sorbitan stearates or sorbitan behenins.

Optionally, $R^1$ is a linear or branched alkyl group having 5 to 29 carbons comprising at least 1 unsaturated bond. Examples of compounds used to form residues of Formula (IIa') wherein at least one R is selected from —C(O)$R^1$; and $R^1$ contains least 1 unsaturated bond, include, but are not limited to, sorbitan trioleate (i.e., wherein $R^1$ is —$C_7H_{14}CH=CHC_8H_{17}$). Other examples include but are not limited to mono-, di-, and tri-substituted sorbitans derived from palmitoleic acid, lineolic acid, arachidonic acid, and erucic acid.

In one embodiment, X of Formula (IIa') is employed, wherein R is further limited to independently a direct bond to NHC(O), —H; —$(CH_2CH_2O)_n(CH(CH_3)CH_2O)_mR^2$; or —$(CH_2CH_2O)_n(CH(CH_3)CH_2O)_mC(O)R^1$. In this embodiment, at least one R is independently —$(CH_2CH_2O)_n(CH(CH_3)CH_2O)_mR^2$ or —$(CH_2CH_2O)_n(CH(CH_3)CH_2O)_mC(O)R^1$. Compounds forming X of Formula (IIa'), wherein at least one R is —$(CH_2CH_2O)_n(CH(CH_3)CH_2O)_mR^2$ or —$(CH_2CH_2O)_n(CH(CH_3)CH_2O)_mC(O)R^1$, wherein each m is independently 0 to 20, each n is independently 0 to 20, and n+m is greater than 0 are known as polysorbates and are commercially available under the tradename TWEEN. These polysorbates can be mono-substituted, di-substituted, or tri-substituted with alkyl groups $R^1$ or $R^2$. It is known that commercially available polysorbates, contain a mixture of the various polysorbates ranging from where each $R^2$ is H (unsubstituted), and polysorbates where each $R^1$ is a linear or branched alkyl group having 5 to 29 carbons (fully substituted); and mixtures of various substitutions thereof. Examples of compounds used to form X of Formula (IIa') include polysorbates such as polysorbate tristearate, and polysorbate monostearate. Examples of compounds used to form X of Formula (IIa') wherein m+n is greater than 0, and wherein $R^1$ comprises at least 1 unsaturated bond, include but are not limited to, polysorbate trioleate (wherein $R^1$ is $C_7H_{14}CH=CHC_8H_{17}$), are sold commercially under the name Polysorbate 80. Reagents may include mixtures of compounds having various values for R, $R^1$, and $R^2$, and may also include mixtures of compounds where $R^1$ comprises at least one unsaturated bond with compounds where $R^1$ is fully saturated. In one aspect, $R^2$ is H and m is a positive integer.

In one embodiment, X is selected from Formula (IIb). Compounds used to form X of Formula (IIb) are known as alkyl citrates. These citrates can be present as a mono-substituted, di-substituted, or tri-substituted compound with alkyl groups. It is known that commercially available citrates contain a mixture of the various citrates as well as citric acids from where R and each $R^4$ is —H, ranging to citrates where each $R^4$ is a linear or branched alkyl group having 6 to 30 carbons optionally comprising at least 1 unsaturated bond; and mixtures of various substitutions thereof. Mixtures of citrates having various values for $R^1$, $R^2$, and $R^4$ may be used, and may also include mixtures of compounds where $R^1$ comprises at least one unsaturated bond with compounds where $R^1$ is fully saturated. Alkyl citrates are also commercially available wherein m+n is greater than 0, $R^4$ is —$(CH_2CH_2O)_n(CH(CH_3)CH_2O)_mR^2$; or —$(CH_2CH_2O)_n(CH(CH_3)CH_2O)_mC(O)R^1$ and are present in the various substitutions from wherein R and each $R^2$ is H to wherein each $R^1$ and/or $R^2$ is a linear or branched alkyl group having 5 to 30 carbons optionally comprising at least 1 unsaturated bond. Examples of compounds used to form X of Formula (IIb) include, but are not limited to, trialkyl citrates.

In one embodiment, X is selected from Formula (IIc). Compounds used to form X of Formula (IIc) are known as pentaerythriol esters. These pentaerythriol esters can be present as a mono-substituted, di-substituted, or tri-substituted with alkyl groups. Preferred compounds used to form X of Formula (IIc) are dipentaerythriol esters, where $R^{19}$ is —$CH_2C[CH_2OR]_3$. It is known that commercially available pentaerythriol esters contain a mixture of the various pentaerythriol esters where $R^{19}$ and each R is —H, ranging to pentaerythriol esters where each R is —C(O)$R^1$, and $R^1$ is a linear or branched alkyl group having 5 to 29 carbons optionally comprising at least 1 unsaturated bond; and mixtures of various substitutions thereof. The pentaerythriol esters also may contain compounds with mixtures of different chain lengths for R, or mixtures of compounds where $R^1$ comprises at least one unsaturated bond with compounds where $R^1$ is fully saturated.

Residue X of Formulas (IIa), (IIb), and (IIc) can all be bio-based derived. By "bio-based derived", it is meant that at least 10% of the material can be produced from non-crude oil sources, such as plants, other vegetation, and tallow. In one embodiment, X is from about 10% to 100% bio-based derived. In one embodiment, X is from about 35% to 100% bio-based derived. In another embodiment, X is from about 50% to 100% bio-based derived. In one embodiment, X is from about 75% to 100% bio-based derived. In one embodiment, X is 100% bio-based derived. The average OH value of the substituted sugar alcohol compounds used to form X can range from just greater than 0 to about 230. In one embodiment, the average OH value is from about 10 to about 175, and in another embodiment, the average OH value is from about 25 to about 140.

In one embodiment, the hydrophobic compound further comprises at least one moiety Q to form Formula (I'):

-Q-NHC(O)—X— (I')

where Q is a monovalent, divalent, or polyvalent moiety selected from linear or branched, cyclic or acyclic, alkylene groups optionally containing at least one group selected from alkoxy, phenyl, siloxane, urethane, urea, biuret, uretdione, cyclized isocyanate, allophanate, or isocyanurate. Moiety Q can be formed from an isocyanate, diisocyanate, or polyisocyanate compound. In one embodiment, Q is the residue of an isocyanate, diisocyanate, or polyisocyanate, herein defined as the molecular structure of an isocyanate, diisocyanate, or polyisocyanate where all isocyanate groups NCO have been removed. For example, one method of making the compounds of the present invention includes reacting a substituted sugar alcohol compound, or mixtures thereof, with an isocyanate group-containing compound selected from an isocyanate, diisocyanate, polyisocyanate, or mixture thereof. Where multiple isocyanate groups are present, the isocyanate group-containing compound adds to the branched nature of the polymer. The term "polyisocyanate" is defined as di- and higher-functional isocyanates, and the term includes oligomers. Any monoisocyanate or polyisocyanate having predominately two or more isocyanate groups, or any isocyanate precursor of a polyisocyanate having predominately two or more isocyanate groups, is suitable for use in this invention. For example, hexamethylene diisocyanate homopolymers are suitable for use herein and are commercially available. In this case, Q would be a linear $C_6$ alkylene having cyclized isocyanate groups. It is recognized that minor amounts of diisocyanates can remain in products having multiple isocyanate groups. An example of this is a biuret containing residual small amounts of hexamethylene diisocyanate.

Also suitable for use as the polyisocyanate reactant are hydrocarbon diisocyanate-derived isocyanurate trimers, where Q is a trivalent linear alkylene having an isocyanurate group. Preferred is DESMODUR N-100 (a hexamethylene diisocyanate-based compound available from Bayer Corporation, Pittsburgh, Pa.). Other triisocyanates useful for the purposes of this invention are those obtained by reacting three moles of toluene diisocyanate, where Q is a trivalent polyaromatic ring structure having a cyclized isocyanate group. The isocyanurate trimer of toluene diisocyanate and that of 3-isocyanatomethyl-3,4,4-trimethylcyclohexyl isocyanate are other examples of triisocyanates useful for the purposes of this invention, as is methane-tris-(phenylisocyanate). Precursors of polyisocyanate, such as diisocyanate, are also suitable for use in the present invention as substrates for the polyisocyanates. DESMODUR N-3300, DESMODUR N-3600, DESMODUR Z-4470, DESMODUR H, DESMODUR N3790, and DESMODUR XP 2410, from Bayer Corporation, Pittsburgh, Pa., and bis-(4-isocyanatocylohexyl)methane are also suitable in the invention.

Preferred polyisocyanate reactants are the aliphatic and aromatic polyisocyanates containing biuret structures, or polydimethyl siloxane containing isocyanates. Such polyisocyanates can also contain both aliphatic and aromatic substituents.

Preferred as the (poly)isocyanate reactant for all the embodiments of the invention herein are hexamethylene diisocyanate homopolymers commercially available, for instance as DESMODUR N-100, DESMODUR N-75 and DESMODUR N-3200 from Bayer Corporation, Pittsburgh, Pa.; 3-isocyanatomethyl-3,4,4-trimethylcyclohexyl isocyanate available, for instance as DESMODUR I (Bayer Corporation); bis-(4-isocyanatocylohexyl)methane available, for instance as DESMODUR W (Bayer Corporation) and diisocyanate trimers of formulas:

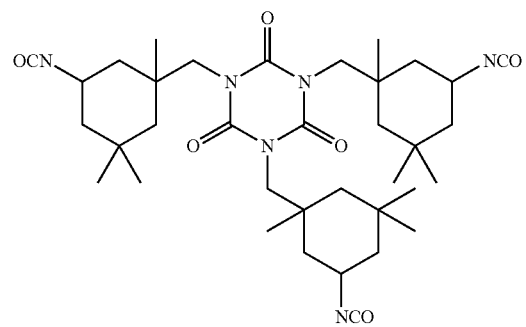
(Va)

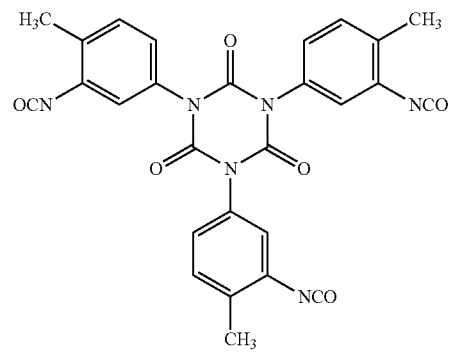
(Vb)

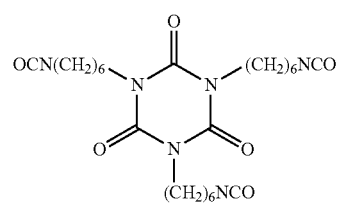
(Vc)

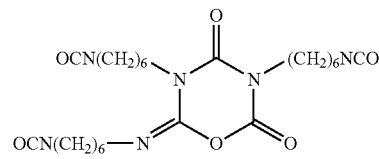
(Vd)

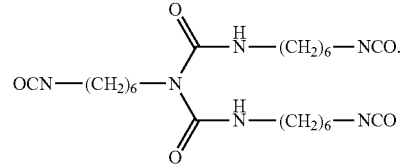
(Ve)

The diisocyanate trimers (Va-e) are available, for instance as DESMODUR Z4470, DESMODUR IL, DESMODUR N-3300, DESMODUR XP2410, and DESMODUR N100, respectively, from Bayer Corporation. In one embodiment, Q is selected from Formulas (IIIa), (IIIb), (IIIc), (IIId), or (IIIe):

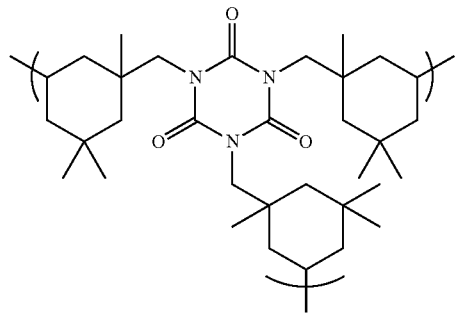
(IIIa)

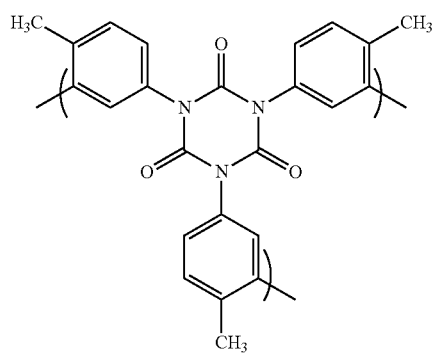
(IIIb)

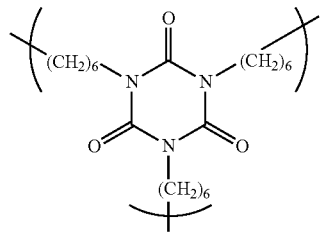
(IIIc)

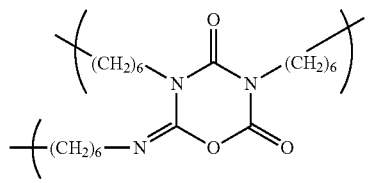
(IIId)

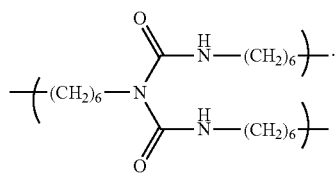
(IIIe)

In one embodiment, the hydrophobic compound further comprises at least one linkage selected from Formulas (IVa), (IVb), (IVc), or mixtures thereof:

$$R^6\text{-}D \qquad (IVa),$$

$$R^{15}\text{---}(OCH_2CH(OR^{16})CH_2)_z\text{---}OR^{17} \qquad (IVb),$$

$$\text{---}NH\text{---}C(O)\text{---}NH\text{---}X \qquad (IVc)$$

wherein D is selected from —N($R^{12}$)—C(O)—NH—, —OC(O)NH—, —C(O)NH—, —SC(O)NH—, —O—($CH_2CH_2O)_s(CH(CH_3)CH_2O)_t$—C(O)NH—, or —[C(O)]—O—($CH_2CH_2O)_s(CH(CH_3)CH_2O)_t$—C(O)NH—; X is defined as above; $R^6$ is selected from a —$C_1$ to $C_{30}$ linear or branched alkyl optionally comprising at least one unsaturated group, a hydroxy- or urethane-functional $C_1$ to $C_{30}$ linear or branched alkyl, a hydroxy- or urethane-functional linear or branched $C_1$ to $C_{30}$ polyether, a hydroxy- or urethane-functional linear or branched polyester having a polyester polymer backbone, a hydroxy- or urethane-functional linear or branched organosiloxane, an amine- or urea-functional linear or branched organosiloxane, a thiol- or thiocarbonate functional $C_1$ to $C_{30}$ linear or branched alkyl, an amine- or urea-functional $C_1$ to $C_{30}$ linear or branched alkyl,

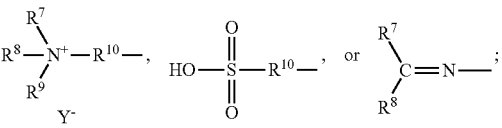

wherein $R^7$, $R^8$, and $R^9$ are each independently, —H, —$C_1$ to $C_6$ alkyl, or combinations thereof; $R^{10}$ is a divalent alkyl group of 1 to 20 carbons; $R^{12}$ is —H or a monovalent C1 to C6 alkyl group; $R^{15}$, $R^{16}$, and $R^{17}$ are each independently a —H, —C(O)NH—, —$R^{18}$; or —C(O)$R^{18}$ provided that at least one $R^{15}$, $R^{16}$, or $R^{17}$ is a —C(O)NH—; $R^{18}$ is independently a linear or branched alkyl group having 5 to 29 carbons optionally comprising at least 1 unsaturated bond; z is 1 to 15; Y is Cl; s is an integer of 0 to 50; t is an integer of 0 to 50; and s+t is greater than 0. Such a linkage may be formed by reacting active isocyanate groups with another isocyanate-reactive compound selected from water, organic compounds of Formula (VIa)

$$R^5\text{-}A \qquad (VIa),\text{ or}$$

organic compounds of Formula (VIb)

$$R^3\text{---}(OCH_2CH(OR^3)CH_2)_z\text{---}OR^3 \qquad (VIb),$$

or mixtures thereof, wherein $R^5$ is selected from a —$C_1$ to $C_{30}$ linear or branched alkyl optionally comprising at least one unsaturated group, a hydroxy-functional $C_1$ to $C_{30}$ linear or branched alkyl, a hydroxy-functional linear or branched $C_1$ to $C_{30}$ polyether, a hydroxy-functional linear or branched polyester having a polyester polymer backbone, a hydroxy-functional linear or branched organosiloxane, an amine-functional linear or branched organosiloxane, a thiol-functional $C_1$ to $C_{30}$ linear or branched alkyl, an amine-functional $C_1$ to $C_{30}$ linear or branched alkyl,

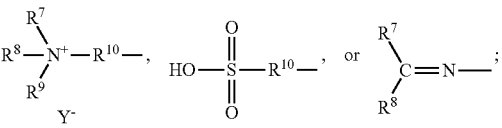

A is selected from —N($R^{12}$)H, —OH, —COOH, —SH, —O—($CH_2CH_2O)_s(CH(CH_3CH_2O)_t$—H, or (C(O)—O—($CH_2CH_2O)_s(CH(CH_3)CH_2O)_t$H; $R^3$ is independently selected from —H; —$R^{18}$; or —C(O)$R^{18}$, provided that at least one $R^3$ is —H; z is defined as above; $R^{12}$ is defined as above; $R^{18}$ is defined as above; and s and t are defined as above. The term "branched", as used herein, means that the functional chain can be branched at any point, for example as a quaternary substituted carbon, and can contain any number of branched substitutions.

When optimum stain release is desired, for example, the compound selected from Formula (VIa), (VIb), or water reacts with about 0.1 mol % to about 70 mol % of reactive isocyanate groups, and the substituted sugar alcohols react with about 30 mol % to about 99.9 mol % of reactive isocyanate groups, to form a urethane compound where about 30 mol % to about 99.9 mol % of total urethane linkages present in the compound fit Formula (I) and about 0.1 mol % to about 70 mol % of total reactive isocyanate groups present fit one or more of Formulas (IVa), (IVb), or (IVc). In another embodiment, the compound selected from Formula (VIa), (VIb), or water reacts with about 40 mol % to about 70 mol % of reactive isocyanate groups, and the substituted sugar alcohols react with about 30 mol % to about 60 mol % of reactive isocyanate groups, to form a urethane compound where about 30 mol % to about 60 mol % of total urethane linkages present in the compound fit Formula (I) and about 40 mol % to about 70 mol % of total reactive isocyanate groups present fit one or more of Formulas (IVa), (IVb), or (IVc). Preferably the number of linkages of Formula (I) is greater than the sum of linkages of Formulas (IVa), (IVb), and (IVc).

In one embodiment, the linkage of Formula (IVc) is present in the hydrophobic compound. Such a linkage is a urea functional group and can be formed from reacting water with active isocyanate groups in the compound. In a further embodiment, the linkage of Formula (IVa) is present, where D is —O—$(CH_2CH_2O)_s(CH(CH_3)CH_2O)_t$—C(O)NH—, or —[C(O)]—O—$(CH_2CH_2O)_s(CH(CH_3)CH_2O)_t$—C(O)NH—. Such a linkage may be formed by reacting a compound of Formula (VIa). Such a compound can be a hydrophilic water-solvatable material comprising at least one hydroxy-terminated polyether of Formula (VIa) wherein isocyanate-reactive group A is —O—$(CH_2CH_2O)_s(CH(CH_3)CH_2O)_t$—H or —[C(O)]—O—$(CH_2CH_2O)_s(CH(CH_3)CH_2O)_t$—H. In this embodiment, —$(CH_2CH_2O)$— represents oxyethylene groups (EO) and —$(CH(CH_3)CH_2O)$— represents oxypropylene groups (PO). These polyethers can contain only EO groups, only PO groups, or mixtures thereof. These polyethers can also be present as a tri-block copolymer designated PEG-PPG-PEG (polyethylene glycol-polypropylene glycol-polyethylene glycol). Preferably, the polyethers are the commercially available methoxypolyethylene glycols (MPEG's), or mixtures thereof. Also commercially available, and suitable for the preparation of the compositions of the present invention, are butoxypolyoxyalkylenes containing equal amounts by weight of oxyethylene and oxypropylene groups (Union Carbide Corp. 50-HB Series UCON Fluids and Lubricants) and having an average molecular weight greater than about 1000. In one aspect, the hydroxy-terminal polyethers of Formula (VIa) have an average molecular weight equal to or greater than about 200. In another aspect, the average molecular weight is between 350 and 2000.

In another embodiment, the linkage of Formula (IVa) is present, where D is —N($R^{12}$)—C(O)—NH—, —OC(O)NH—, —C(O)NH—, or —SC(O)NH—. Such a linkage may be formed from an organic compound of Formula (VIa), where isocyanate-reactive group A is —OH, —C(O)OH, —SH, or —NH($R^{12}$); and $R^5$ is selected from a —$C_1$ to $C_{30}$ linear or branched alkyl optionally comprising at least one unsaturated group, a hydroxy-functional $C_1$ to $C_{30}$ linear or branched alkyl, a hydroxy-functional linear or branched $C_1$ to $C_{30}$ polyether, a hydroxy-functional linear or branched polyester having a polyester polymer backbone, a hydroxy- or amine-functional linear or branched organosiloxane, a thiol-functional $C_1$ to $C_{30}$ linear or branched alkyl, an amine-functional $C_1$ to $C_{30}$ linear or branched alkyl.

Where D is —OC(O)NH— or A is —OH, examples of Formula (VIa) include but are not limited to alkyl alcohols such as propanol, butanol, or fatty alcohols including stearyl alcohol ($R^5$ is a —$C_1$ to $C_{30}$ linear or branched alkyl optionally comprising at least one unsaturated group); alkyl diols or polyols such as ethanediol, propanediol, butanediol, or hexanediol ($R^5$ is a hydroxy-functional $C_1$ to $C_{30}$ linear or branched alkyl); alkylene glycol ethers such as triethylene glycol, tetraethylene glycol, poly(ethylene glycol) (PEG), poly(propylene glycol) (PPG), poly(tetrahydrofuran), or glycol ethers having mixtures of PEG, PPG, or THF units ($R^5$ is a hydroxy-functional linear or branched $C_1$ to $C_{30}$ polyether); polyester polyols ($R^5$ is a hydroxy-functional linear or branched polyester having a polyester polymer backbone); silicone prepolymer polyols ($R^5$ is a hydroxy-functional linear or branched organosiloxane); N,N-dimethylaminoethanol ($R^5$ is an amine-functional $C_1$ to $C_{30}$ linear or branched alkyl); choline chloride or betaine HCl ($R^5$ is $Y^-(R^7)(R^8)(R^9)N^+R^{10}$—); butanone oxime ($R^5$ is $(R^7)(R^8)$C=N—). The polyether polyols can contain only EO groups, only PO groups, only THF groups, or mixtures thereof. These polyethers can also be present as a block copolymer, such as that designated by PEG-PPG-PEG (polyethylene glycol-polypropylene glycol-polyethylene glycol). In one aspect, the polyether glycols have an average molecular weight equal to or greater than about 200. In another aspect, the average molecular weight is between 350 and 2000.

Where D is —C(O)NH— or A is —COOH, examples of Formula (VIa) include but are not limited to fatty acids such as caprylic acid, capric acid, lauric acid, mysteric acid, palmitic acid, stearic acid, arachidic acid, behenic acid, lignoceric acid, palmitoleic acid, lineolic acid, arachidonic acid, oleic acid, or erucic acid ($R^5$ is a —$C_1$ to $C_{30}$ linear or branched alkyl optionally comprising at least one unsaturated group); hydroxy-containing acids such as hydroxycaprylic acid, hydroxycapric acid, hydroxylauric acid, hydroxymysteric acid, hydroxypalmitic acid, hydroxystearic acid, hydroxyarachidic acid, hydroxybehenic acid, hydroxylignoceric acid, hydroxypalmitoleic acid, hydroxylineolic acid, hydroxyarachidonic acid, hydroxyoleic acid, or hydroxyerucic acid ($R^5$ is a hydroxy-functional $C_1$ to $C_{30}$ linear or branched alkyl); and mercaptoalkanoic acids such as mercaptopropionic acid ($R^5$ is a thiol-functional $C_1$ to $C_{30}$ linear or branched alkyl).

Where D is —SC(O)NH— or A is —SH, specific examples of Formula (VIa) include but are not limited to alkyl thiols such as lauryl mercaptan or dodecyl mercaptan ($R^5$ is a —$C_1$ to $C_{30}$ linear or branched alkyl optionally comprising at least one unsaturated group). Where D is —N($R^{12}$)—C(O)—NH— or A is —NH($R^{12}$), specific examples of Formula (VIa) include but are not limited to alkyl amines such as diisopropylamine, propylamine, hexylmine, or laurylamine ($R^5$ is a —$C_1$ to $C_{30}$ linear or branched alkyl optionally comprising at least one unsaturated group); alkanolamines such as ethanolamine or propanolamine ($R^5$ is a hydroxy-functional $C_1$ to $C_{30}$ linear or branched alkyl); silicone prepolymer polyamines ($R^5$ is a amine-functional linear or branched organosiloxane); alkyl diamines ($R^5$ is an amine-functional $C_1$ to $C_{30}$ linear or branched alkyl); and aminoalkanesulfonic acids such as 2-aminoethanesulfonic acid ($R^5$ is HO—$S(O)_2R^{10}$—).

In a further embodiment, the hydrophobic compound comprises a linkage of Formula (IVb). Such linkages may be formed by the reaction of active isocyanate groups with a compound of Formula (VIb). These compounds are commonly referred to as polyglycerols. These polyglycerols can be present where $R^3$ is independently a —H; —$R^{18}$; —C(O)$R^{18}$ provided that at least one $R^3$ is a —H; and wherein $R^{18}$ is independently a linear or branched alkyl group having 5 to 29 carbons optionally comprising at least 1 unsaturated bond. Specific examples include but are not limited to triglycerol monostearate, triglycerol distearate, hexaglycerol monostearate, hexaglycerol distearate, decaglyceryl mono (carpylate/caprate), decaglyceryl di(carpylate/caprate), decaglycerol, polyglycerol-3, and C18 diglyceride.

In one embodiment, the hydrophobic compound comprises more than one type of linkages selected from Formulas (IVa), (IVb), and (IVc). In addition to compounds of the present invention as described herein, these compositions may also comprise additional compounds that are present from commercially available sorbitans, polysorbates, alkyl citrates, or pentaethritols. These compounds can be present as a mixture of the various substituted sugar alcohols from fully unsubstituted to fully substituted, and the various substitutions in between, and optionally, the linear or branched alkyl group having 5 to 29 carbons comprises at least 1 unsaturated bond.

The laundry treatment compositions comprise the hydrophobic compound but may further comprise a solvent selected from organic solvents or water, such that the laundry treatment composition is in the form of a solution, an aqueous emulsion, or an aqueous dispersion.

In one embodiment, the laundry treatment composition further comprises a wax. The wax component includes any of a variety of known waxes, preferably used in a weight ratio of laundry additive composition:wax from about 1:10 to about 10:1. In one aspect, the ratio ranges from about 1:8 to about 8:1, and in another aspect, the ratio ranges from about 2:8 to about 8:2. The melting point of the wax is greater than about 30° C. In one aspect, the melting point is greater than about 30-70° C., and in another aspect, the melting point is greater than about 40-55° C. Examples include animal waxes, plant and vegetable waxes, mineral waxes, petroleum waxes, and synthetic waxes, including silicone waxes. More specifically, the wax is selected from beeswax; microcrystalline wax; oxidized microcrystalline wax; paraffin wax; montan wax; ozokerite wax; carnauba wax; candililla wax; palm wax; whale wax; lanolin; sugar cane wax; sugar esters; polyolefin wax; mono-, di, or tri-glyceride esters; fatty acid ester waxes; or blends thereof. In another embodiment, the wax is selected from silicone wax, a blend of silicone waxes, or a blend of silicone wax with at least one non-silicone wax.

Of particular interest are mono-, di-, or tri-glyceride ester waxes typically found in the food and cosmetics industries. Such compounds can be biological unmodified alkyl esters but also include mono- or di-glycerides modified with reactive compounds including fatty acids or acetic acid. Typically, these compounds are mixtures of compounds containing mono-substituted, di-substituted, and tri-substituted esters of a distribution of chain lengths. Similarly, other polyfunctional alcohols may be esterified with fatty acids to make suitable, functional waxes. Particularly preferred ester compounds include but are not limited to beeswax, candililla wax, carnauba wax, surgarcane wax, palm wax, tribehenin, fatty acid triglycerides, fatty acid glycol esters, acetic esters of monoglycerides, and blends thereof. Such ester compounds are available from Croda, East Yorkshire, England; or DuPont Nutrition & Health, Copenahgen, Denmark.

A variety of silicone waxes may be employed in the invention, including but not limited to alkyl silicones, alkyl aryl silicones, and blends thereof. Particularly preferred are alkylated silicones based on alkyl pendant groups, including those compounds of Formula (IV).

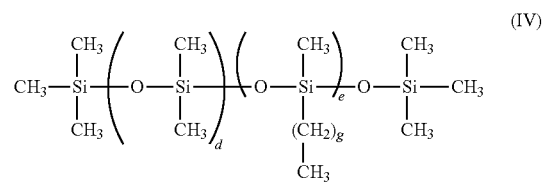

Such compounds range from liquids to soft pastes to hard waxes, and the physical properties can be tailored by varying the molecular weight, alkyl chain lengths, and long alkyl chain content. Preferably, g is 2 to 40. In another aspect, g is 10 to 32, and in another aspect, g is 18 to 32. Variables d and e are independently 2 to 20. In one aspect, d and e are independently 2 to 10, and in another aspect, d and e are independently 2 to 6. The ratio of silicone to alkyls and the chain length of the alkyls determine the melting point and liquidity of the final product. Examples of suitable compounds include DOW CORNING waxes available from Dow Corning, Midland, Mich.; WACKER silicone waxes available from, Wacker, Munchen, Germany; silicone waxes available from Momentive Specialty Chemicals, Inc., Columbus, Ohio; and SILWAX, available from Siltech, Toronto, Canada.

The laundry treatment compositions can be made in one step. The laundry treatment compositions comprising products of more than one substituted sugar alcohol residue and/or one or more linkages of Formulas (IVa), (IVb), and (IVc) can be also made in one step. In one embodiment, if more than one substituted sugar alcohol residue and/or one or more linkages of Formulas (IVa), (IVb), and (IVc) are present, then the synthesis can be completed sequentially. A sequential addition is especially useful when employing substituted sugar alcohols with high OH numbers, or when using polyfunctional compounds of Formulas (VIa) or (VIb). These steps comprise reacting (a) at least one isocyanate group-containing compound selected from isocyanate, diisocyanate, polyisocyanate, or mixtures thereof, and (b) at least one substituted sugar alcohol. When a second compound is used selected from water, Formula (VIa), or Formula (VIb), molar concentrations of the at least one substituted sugar alcohol are such that there remains unreacted isocyanate groups to react with the one or more compounds selected from water, Formula (VIa), or Formula (VIb).

This reaction is typically conducted by charging a reaction vessel with the isocyanate, diisocyanate, or polyisocyanate, and at least one substituted sugar alcohol, and optionally a second compound selected from water, Formula (VIa), or Formula (VIb). The order of reagent addition is not critical, but if water is used, the water should be added after the isocyanates and at least one substituted sugar alcohol are reacted.

The specific weight of the reactants charged is based on their equivalent weights and on the working capacity of the reaction vessel, and is adjusted so that substituted sugar alcohol will be consumed in the first step. A suitable dry organic solvent free of isocyanate-reactive groups is typically used as a solvent. Ketones are the preferred solvents, and methylisobutylketone (MIBK) is particularly preferred for convenience and availability. The charge is agitated, and temperature adjusted to about 40° C. to 70° C. Typically, a catalyst such as iron(III) chloride in an organic solvent is then added, typically in an amount of from about 0.01 to about 1.0 weight % based on the dry weight of the composition, and the temperature is raised to about 80° C. to 100° C. A co-catalyst, such as sodium carbonate, may also be used. If water is to be added, the initial reaction is conducted so that less than 100% of the isocyanate groups are reacted. In the second step after holding for several hours, additional solvent, water, and optionally a second compound are added. In one embodiment, and the mixture is allowed to react for several more hours or until all of the isocyanate has been reacted. In the process of preparing the aqueous solutions or dispersions of the laundry treatment compositions, additional water can then be added along with surfactants, if desired, to the urethane compounds and stirred until thoroughly mixed. Following a homogenization or sonification step, the organic solvent can be removed by evaporation at reduced pressure, and the remaining aqueous solution or dispersion of the compound of the present invention can be used as is or subjected to further processing.

It will be apparent to one skilled in the art that many changes to any or all of the above procedures can also be used to optimize the reaction conditions for obtaining maximum yield, productivity, or product quality.

In another embodiment, the present invention is a laundry additive composition comprising a first laundry treatment composition and a second laundry treatment composition which is different than the first laundry treatment composition, where the first laundry treatment composition comprises a hydrophobic compound having at least one linkage of Formula I:

$$\text{NHC(O)—X—} \tag{I}$$

wherein X is the residue of a cyclic or acyclic sugar alcohol which is substituted with at least one $-R^1$; $-C(O)R^1$; $-(CH_2CH_2O)_n(CH(CH_3)CH_2O)_mR^2$; or $-(CH_2CH_2O)_n(CH(CH_3)CH_2O)_mC(O)R^1$; where the cyclic or acyclic sugar alcohol is selected from a saccharide, reduced sugar, aminosaccharide, aldonic acid, or aldonic acid lactone; wherein each n is independently 0 to 20; each m is independently 0 to 20; m+n is greater than 0; each $R^1$ is independently a linear or branched alkyl group having 5 to 29 carbons optionally comprising at least 1 unsaturated bond; each $R^2$ is independently —H, a linear or branched alkyl group having 6 to 30 carbons optionally comprising at least 1 unsaturated bond, or mixtures thereof. This laundry additive composition can be formed by adding the components separately to the laundry machine on-site, or the first laundry treatment composition can be pre-mixed with the second laundry treatment composition. In one embodiment, the total hydrophobic compound content (solids content) from the first laundry treatment composition composes from about 10% to about 40% by weight of the total laundry additive composition, and from about 2% to 30% by weight of the laundry liquor. In another embodiment, the total hydrophobic compound content (solids content) from the first laundry treatment composition composes from about 15% to about 25% by weight of the total laundry additive composition.

In one embodiment, the second laundry treatment composition is a laundry detergent composition, fabric softener composition, wrinkle release agent, stain release agent, bleaching agent, color brightening agent, or mixtures thereof. Other additives commonly used with such treating agents or finishes are also optionally present, such as surfactants, emulsifiers, pH adjusters, silicones, soil release agents, cross linkers, wetting agents, wax extenders, anti-static agents, fragrances, antimicrobials and preservatives, dyes and colorants, viscosity control agents, antioxidants and sunscreen materials, pearlizing and opacifying agents, dye transfer inhibitors and dye fixatives, chlorine scavengers, electrolytes, enzymes, and other additives known by those skilled in the art. Suitable surfactants include anionic, cationic, nonionic, N-oxides and amphoteric surfactants. Examples of such additives include processing aids, foaming agents, lubricants, anti-stains, and the like.

Such additional components comprise compounds or compositions that provide surface effects such as no iron, easy to iron, shrinkage control, wrinkle free, permanent press, moisture control, softness, strength, anti-slip, anti-static, anti-snag, anti-pill, stain release, soil repellency, soil release, water repellency, odor control, antimicrobial, sun protection, cleanability and similar effects. One or more of such treating agents or finishes are applied to the substrate before, after, or simultaneously with the composition of the present invention. For example, for fibrous substrates, when synthetic or cotton fabrics are treated, use of a wetting agent can be desirable, such as ALKANOL 6112 available from E. I. du Pont de Nemours and Company, Wilmington, Del. When cotton or cotton-blended fabrics are treated, a wrinkle-resistant resin can be used such as PERMAFRESH EFC available from Omnova Solutions, Chester, S.C.

Optionally, a blocked isocyanate is added with the composition of the present invention to further promote durability (i.e., as a blended composition). An example of a suitable blocked isocyanate to use in the present invention is PHOBOL XAN available from Huntsman Corp, Salt Lake City, Utah. Other commercially available blocked isocyanates are also suitable for use herein. The desirability of adding a blocked isocyanate depends on the particular application for the copolymer. For most of the presently envisioned applications, it does not need to be present to achieve satisfactory cross-linking between chains or bonding to the substrate. When added as a blended isocyanate, amounts up to about 20% by weight are added.

The method of imparting water repellency and optionally stain release to fibrous substrates comprising contacting a fibrous substrate with a laundry treatment composition inside a laundry machine can be practiced by any suitable method. Preferably, water is used to help disperse the laundry treatment composition, such as by a wash cycle or rinse cycle of the laundry machine. The water temperature used in the wash cycle or rinse cycle may be any temperature including cold, room temperature, warm, or hot. Methods of contacting the additive with the substrate include, but are not limited to, introducing the laundry treatment composition by pouring the treatment composition into the basin of the laundry machine, pouring the treatment composition into a detergent or treating agent reservoir of the laundry machine, adding a dissolvable pouch containing the additive composition, or adding a controlled-release reusable container containing the additive composition. Any of the above methods may also be employed using a laundry additive composition comprising two laundry treatment compositions. Alternatively, the laundry additive composition or laundry treatment composition may be introduced into an aqueous liquor and contacted with a fibrous substrate into a tub, bucket or sink, such as when washing fabrics by hand.

In one embodiment, the laundry treatment composition or laundry additive composition is poured into the wash basin, or into a detergent or treating agent reservoir, of the laundry machine and the machine is programmed to run a wash cycle or rinse cycle. In one embodiment, the wash basin is partially filled with water, the laundry treatment composition or laundry additive composition is poured into the water, and the water is allowed to fill the wash basin. Detergent is then optionally added, the fibrous substrate is added to the wash basin, and the laundry machine is allowed to run a full wash or rinse cycle.

In one embodiment, the method further comprises a step of curing the hydrophobic compound with heat. Any suitable heating method may be used, such as machine drying in a dryer, ironing, steaming, blow drying, drying under a heat lamp, or drying near a radiative source of heat. In one embodiment, the cure step occurs at a temperature of about 30° C. to about 100° C. In another embodiment, the cure step occurs at a temperature of about 35° C. to about 80° C., and in another embodiment the temperature is about 40° C. to about 60° C., for a time of at least 30 minutes, preferably at least 35 minutes, and more preferably at least 40 minutes. Any drying method can be practiced, including air drying, tumbling dry, or heating the substrate to dryness. Such drying cycles are commonly found on clothes drying machines, including a tumble dry cycle, a tumble dry with heat cycle, or a heated non-tumble cycle. In one embodiment, the treated substrate is tumbled dry with heat. Such curing enhances oil-, water- and soil repellency and durability of the repellency. While these curing conditions are typical, some commercial apparatus may operate outside these ranges because of its specific design features.

The compound or composition of the present invention is applied to the substrate individually, or in combination with other optional textile finishes or surface treating agents. Such optional additional components include treating agents or finishes to achieve additional surface effects, or additives commonly used with such agents or finishes.

In another embodiment, the present invention is a fibrous substrate made by the process as disclosed above. The present invention further comprises substrates treated with a compound or composition of the present invention as described above. Suitable substrates include fibrous substrates. The fibrous substrates include fibers, yarns, fabrics, fabric blends, textiles, nonwovens, paper, leather, and carpets. These are made from natural or synthetic fibers including cotton, cellulose, wool, silk, rayon, nylon, aramid, acetate, acrylic, jute, sisal, sea grass, coir, polyamide, polyester, polyolefin, polyacrylonitrile, polypropylene, polyaramid, or blends thereof. By "fabric blends" is meant fabric made of two or more types of fibers. Typically these blends are a combination of at least one natural fiber and at least one synthetic fiber, but also can include a blend of two or more natural fibers or of two or more synthetic fibers. The nonwoven substrates include, for example, spunlaced nonwovens, such as SONTARA available from E. I. du Pont de Nemours and Company, Wilmington, Del., and spunbonded-meltblown-spunbonded nonwovens. The treated substrates of the present invention have excellent water repellency and optionally stain release properties.

Test Methods and Materials

All solvents and reagents, unless otherwise indicated, were purchased from Sigma-Aldrich, St. Louis, Mo., and used directly as supplied.

Sorbitan tristearate is commercially available from Croda, East Yorkshire, England, or DuPont Nutrition & Health, Copenhagen, Denmark. Sorbitan tribehenin 50 was obtained from DuPont Nutrition & Health, Copenhagen, Denmark. Stearyl pentaerythritol is commercially available from DuPont Nutrition & Health, Copenhagen, Denmark. Tri(2-octadodecyl) citrate is commercially available from Lubrizol, Wickliffe, Ohio.

DESMODUR N-100 was obtained from Bayer Corporation, Pittsburgh, Pa.

PHOBOL XAN was obtained from Huntsman Corp, Salt Lake City, Utah.

SILWAX D226 and SILWAX E1316 are alkylated silicone waxes available from Siltech Corporation, Toronto, Canada.

CHEMIDEX S is a stearamidopropyl dimethylamine surfactant available from Lubrizol, Wickliffe, Ohio.

ETHAL LA-4 is an ethoxylated emulsifier available from Ethox Chemicals, Greenville, S.C.

WITCO C-6094 is a modified alpha olefin sulfonate surfactant available from AkzoNobel, Chicago, Ill.

WACKER SRE is a silicone emulsifier, and WACKER W23 is a polymethylsiloxane wax, both available from Wacker Chemie AG, München, Germany.

DOW CORNING 2503 is a stearyl dimethicone wax available from Dow Corning, Midland, Mich.

The following tests were employed in evaluating the examples herein.

Test Method 1—Water Repellency

The water repellency of a treated substrate was measured according to the DuPont Technical Laboratory Method as outlined in the TEFLON Global Specifications and Quality Control Tests information packet. The test determines the resistance of a treated substrate to wetting by aqueous liquids. Drops of water-alcohol mixtures of varying surface tensions are placed on the fabric and the extent of surface wetting is determined visually. The test provides a rough index of aqueous stain resistance. The higher the water repellency rating, the better the resistance the finished substrate has to staining by water-based substances. The composition of standard test liquids is shown in the following Table 1. Ratings of 0.5 increments are determined by subtracting one half from the numbers in Table 1 for borderline passing of the test liquid.

TABLE 1

| Standard Test Liquids | | |
|---|---|---|
| Water Repellency Rating Number | Composition Vol. %, Isopropyl Alcohol | Composition, Vol. % Distilled Water |
| 1 | 2 | 98 |
| 2 | 5 | 95 |
| 3 | 10 | 90 |
| 4 | 20 | 80 |
| 5 | 30 | 70 |
| 6 | 40 | 60 |
| 7 | 50 | 50 |
| 8 | 60 | 40 |
| 9 | 70 | 30 |
| 10 | 80 | 20 |
| 11 | 90 | 10 |
| 12 | 100 | 0 |

Test Method 2—Spray Rating

The dynamic water repellency of treated substrates was measured according to the American Association of Textile Chemists and Colorists (AATCC) TM-22. Samples are visually scored by reference to published standards, with a rating of 100 denoting no water penetration or surface adhesion. A rating of 90 denotes slight random sticking or wetting without penetration; lower values indicate progressively greater wetting and penetration. Test Method 2, the dynamic water repellency test, is a demanding and realistic test of water repellency.

Test Method 3—Wash Durability

Some fabric samples were laundered according to International Standard specified domestic washing procedure for textile testing. Fabric samples were loaded into a horizontal drum, front-loading type (Type A, WASCATOR FOM 71 MP-Lab) of automatic washing machine with a ballast load to give a total dry load of 4 lb. A commercial detergent was added (AATCC 1993 standard Reference Detergent WOB) and the washer program ISO 6330:2001-7A was used. After washing was complete, the entire load was placed into a KENMORE automatic dryer and dried on high for 45-50 min.

Test Method 4—Fabric Pre-Treatment

The fabrics treated in this study were 100% by weight khaki cotton twill available from SDL Atlas Textile Testing Solutions, Rock Hill, S.C. 29732 and 100% by weight red polyester fabric available from L. Michael OY, Finland. "New" fabrics were used without any pre-treatment method.

"Pre-washed" fabrics were washed in a KENMORE stackable washer/dryer with 26.5 L washer capacity prior to application of the treatment solution. The washing machine was programmed for a small load and set to run a wash/rinse cycle with warm water. The wash cycle was started by setting the dial to Heavy Duty Super and pulling the dial. The wash basin was allowed to completely fill, and 1993 AATCC Standard Reference Detergent WOB (19 g) was then added to the solution. Fabric samples were charged into the wash basin, and the wash cycle was allowed to run to completion. The fabric was then placed into a KENMORE automatic dryer and dried on high for 40 minutes.

"Pre-treated" fabrics simulate textiles that have been treated using an industrial method and washed multiple times by home washing methods. The fabric was first treated with Urethane Dispersion 1 (UD1) polymer or with a partially fluorinated polymethacrylic treating agent, CAPSTONE TC (available from DuPont Chemicals and Fluoroproducts, Wilmington, Del.) using a conventional aqueous pad bath (dipping) process at 30 g/L of the solids content. For the treatment of the cotton fabric, a wetting agent, INVADINE PBN and a catalyzed cross-linking agent, KNITTEX 7636 (all available from Huntsman, Salt Lake City, Utah) were also included in the bath at 5 g/L and 30 g/L, respectively. The fabric was padded in the bath, and the excess liquid was removed by squeeze rollers. The wet pickup was around 95% on the cotton substrate. The "wet pick up" is the weight of the bath solution of the emulsion polymer and additives applied to the fabric, based on the dry weight of the fabric. The fabric was cured at approximately 165° C. for 3 minutes and allowed to "rest" after treatment and cure for at least 2 hours. The treated fabrics had a spray rating of 100 (UD1) and 100 (CAPSTONE TC). The fabrics were then washed according to Test Method 3 to result in spray ratings of 70 (UD1) and 65 (CAPSTONE TC).

For the pre-treatment of the polyester fabric, a wetting agent, INVADINE® PBN (available from Huntsman, Charlotte, N.C., USA) and 60% acetic acid were also included in the bath at 5 g/L and 1 g/L, respectively. The fabric was padded in the bath, and the excess liquid removed by squeeze rollers. The wet pickup was around 55% on the polyester substrate. The "wet pick up" is the weight of the bath solution of the emulsion polymer and additives applied to the fabric, based on the dry weight of the fabric. The fabric was cured at approximately 160° C. for 2 minutes and allowed to "rest" after treatment and cure for about 15 to about 18 hours. The treated fabrics had a spray rating of 100 (UD1) and 100 (CAPSTONE TC). The fabrics were then washed according to Test Method 3 to result in spray ratings of 70 (UD1) and 75 (CAPSTONE TC).

Preparation of Urethane Dispersion 1 (UD1)

Into a 4-neck round bottom flask equipped with an overhead stirrer, thermocouple and condenser was added sorbitan tristearate (519 g), sodium carbonate (3.2 g) and 4-methyl-2-pentanone (MIBK, 668 g). After the solution was heated to 55° C., DESMODUR N100 (140 g) was added and the temperature was increased to 80° C. Catalyst was added at 80° C. and reaction temperature was increased to 95° C. After 6 hours, n-butanol (8.2 g) and water (2.0 g) were added to the reaction mixture. The following morning, the reaction tested negative for active isocyanates, and 167.9 g of SILWAX D226 was added to the reaction mixture.

An aqueous dispersion of the compound was then prepared. Water (2336 g), CHEMIDEX S (18.3 g), ETHAL LA-4 (27.1 g), dipropylene glycol (207.0 g), and acetic acid (13.4 g) were added to a beaker and stirred to form a surfactant solution. The solution was heated to 65° C., and mineral oil (11.9 g) was added. The urethane reaction was cooled to 65° C., and the surfactant solution was slowly added to produce a milky solution. The mixture was emersion blended (2 minutes), homogenized at 6000 psi, and the resulting emulsion was distilled under reduced pressure to remove the solvent. An additional 8.6 g of CHEMIDEX S and 396 g of water was added to yield a non-flammable, cationic urethane dispersion at 25% solids after cooling and filtering.

Preparation of Urethane Dispersion 2 (UD2)

Into a 4-neck round bottom flask equipped with an overhead stirrer, thermocouple and condenser was added sorbitan tristearate (259 g), sodium carbonate (1.6 g) and 4-methyl-2-pentanone (MIBK, 350 g). After the solution was heated to 55° C., DESMODUR N100 (70 g) was added, and the temperature was increased to 80° C. Catalyst was added at 80° C., and the reaction temperature was increased to 95° C. After 6 hours, n-butanol (4.1 g) was added to the reaction mixture. The following morning, the reaction tested negative for active isocyanates, and 83.84 g of SILWAX D226 was added to the reaction mixture.

An aqueous dispersion of the compound was then prepared. Water (2495 g) and WITCO C-6094 (52.9 g) were added to a beaker and stirred to form a surfactant solution. The solution was heated to 65° C., and 1.5 g of WACKER SRE was added. The urethane reaction was cooled to 65° C., and the surfactant solution was slowly added to produce a milky solution. The mixture was emersion blended (2 minutes), homogenized at 6000 psi, and the resulting emulsion was distilled under reduced pressure to remove the solvent and yield a non-flammable anionic urethane dispersion at 14% solids after cooling and filtering.

Preparation of Urethane Dispersion 3 (UD3)

Into a 4-neck round bottom flask equipped with an overhead stirrer, thermocouple and condenser was added sorbitan tristearate (518 g), sodium carbonate (3.2 g) and 4-methyl-2-pentanone (MIBK, 858 g). After the solution was heated to 55° C., DESMODUR N100 (140 g) was added, and the temperature was increased to 80° C. Catalyst was added at 80° C., and the reaction temperature was increased to 95° C. After 6 hours, n-butanol (8.2 g) and water (2.0 g) were added to the reaction mixture.

An aqueous dispersion of the compound was then prepared. Water (1884 g), CHEMIDEX S (14.6 g), ETHAL LA-4 (21.7 g), dipropylene glycol (165.8 g), and acetic acid (10.7 g) were added to a beaker and stirred to form a surfactant solution. The solution was heated to 65° C., and mineral oil (9.6 g) was added. The urethane reaction was cooled to 65° C., and the surfactant solution was slowly added to produce a milky solution. The mixture was emersion blended (2 minutes), homogenized at 6000 psi, and the resulting emulsion was distilled under reduced pressure to remove the solvent. An additional 6.6 g of CHEMIDEX S and 557 g of water was added to yield a non-flammable cationic urethane dispersion at 26% solids after cooling and filtering.

Preparation of Urethane Dispersion 4 (UD4)

Into a 4-neck round bottom flask equipped with an overhead stirrer, thermocouple and condenser was added sorbitan tribehenin 50 (190.35 g), sodium carbonate (1.0 g) and 4-methyl-2-pentanone (MIBK, 233 g). After the solution was heated to 55° C., DESMODUR N100 (45 g) was added and the temperature was increased to 80° C. Catalyst was added at 80° C. and reaction temperature was increased to 95° C. After 6 hours, n-butanol (2.6 g) and water (0.6 g) were added to the reaction mixture.

An aqueous dispersion of the compound was then prepared. Water (673 g), CHEMIDEX S (5.2 g), ETHAL LA-4 (7.7 g), dipropylene glycol (58.9 g), and acetic acid (3.8 g) were added to a beaker and stirred to form a surfactant solution. The solution was heated to 65° C. and mineral oil (4.3 g) was added. The urethane reaction was cooled to 65° C. and the surfactant solution was slowly added to produce a milky solution. The mixture was emersion blended (2 minutes), homogenized at 6000 psi, and the resulting emulsion was distilled under reduced pressure to remove the solvent. An additional 2.2 g of CHEMIDEX S and 178 g of water was added to yield a non-flammable cationic urethane dispersion at 24% solids after cooling and filtering.

Preparation of Urethane Dispersion 5 (UD5)

Into a 4-neck round bottom flask equipped with an overhead stirrer, thermocouple and condenser was added trioctyldodecyl citrate (175.13 g), sodium carbonate (1.15 g), and 4-methyl-2-pentanone (MIBK, 230 g). After the solution was heated to 55° C., DESMODUR N100 (50 g) was added and the temperature was increased to 80° C. Catalyst was added at 80° C., and the reaction temperature was increased to 95° C. After 6 hours, n-butanol (3.0 g) and water (0.7 g) were added to the reaction mixture.

An aqueous dispersion of the compound was then prepared. Water (435 g), CHEMIDEX S (5.0 g), ETHAL LA-4 (7.4 g), dipropylene glycol (56.5 g), and acetic acid (3.6 g) were added to a beaker and stirred to form a surfactant solution. The solution was heated to 65° C. and mineral oil (3.3 g) was added. The urethane reaction was cooled to 65° C., and the surfactant solution was slowly added to produce a milky solution. The mixture was filtered, blended, sonicated (2 minutes), and the resulting emulsion was distilled under reduced pressure to remove the solvent. An additional 1.91 g of CHEMIDEX S and 149 g of water was added to yield a non-flammable cationic urethane dispersion at 25% solids after cooling and filtering.

Preparation of Urethane Dispersion 6 (UD6)

Into a 4-neck round bottom flask equipped with an overhead stirrer, thermocouple and condenser was added stearyl pentaerythitol (184.12 g), sodium carbonate (0.9 g) and 4-methyl-2-pentanone (MIBK, 220 g). After the solution was heated to 55° C., DESMODUR N100 (40 g) was added and the temperature was increased to 80° C. Catalyst was added at 80° C. and reaction temperature was increased to 95° C. After 6 hours, n-butanol (2.4 g) and water (0.6 g) were added to the reaction mixture.

An aqueous dispersion of the compound was then prepared. Water (644 g), CHEMIDEX S (5.0 g), ETHAL LA-4 (7.3 g), dipropylene glycol (56.0 g), and acetic acid (3.6 g) were added to a beaker and stirred to form a surfactant solution. The solution was heated to 65° C. and mineral oil (4.0 g) was added. The urethane reaction was cooled to 65° C. and the surfactant solution was slowly added to produce a milky solution. The mixture was emersion blended (2 minutes), homogenized at 6000 psi and the resulting emulsion was distilled under reduced pressure to remove the solvent. An additional 2.0 g of CHEMIDEX S and 100 g of water was added at 65° C. to yield a non-flammable urethane dispersion at 24% solids after cooling and filtering.

Preparation of Wax Dispersion 1 (WD1) Into a 4-neck round bottom flask equipped with an overhead stirrer, thermocouple and condenser was added DOW CORNING 2503 cosmetic wax (100 g) and MIBK (250 g). The solution was heated to 65° C.

An aqueous dispersion of the compound was then prepared. Water (507 g), CHEMIDEX S (2.2 g), ETHAL LA-4 (3.2 g), dipropylene glycol (24.6 g), and acetic acid (1.6 g) were added to a beaker and stirred to form a surfactant solution. The solution was heated to 65° C. The wax solution temperature was increased to 65° C. and the surfactant solution was slowly added to produce a milky solution. The mixture was blended with excess water, homogenized at 6000 psi and the resulting emulsion was distilled under reduced pressure to remove the solvent. An additional 0.6 of CHEMIDEX S was dissolved at 65° C. after distillation to yield a non-flammable cationic dispersion at 7.56% solids after cooling and filtering.

Preparation of Wax Dispersion 2 (WD2)

Into a 4-neck round bottom flask equipped with an overhead stirrer, thermocouple and condenser was added WACKER W23 (100 g) and MIBK (250 g). The solution was heated to 65° C.

An aqueous dispersion of the compound was then prepared. Water (782 g), CHEMIDEX S (2.2 g), ETHAL LA-4 (2.8 g), dipropylene glycol (24.6 g), and acetic acid (1.5 g) were added to a beaker and stirred to form a surfactant solution. The solution was heated to 65° C. The wax solution temperature was increased to 65° C. and the surfactant solution was slowly added to produce a milky solution. The mixture was blended with excess water, homogenized at 6000 psi, and the resulting emulsion was distilled under reduced pressure to remove the solvent. An additional 0.7 of CHEMIDEX S was dissolved at 65° C. after distillation to yield a non-flammable cationic dispersion at 12% solids after cooling and filtering.

Preparation of Wax Dispersion 3 (WD3)

Into a 4-neck round bottom flask equipped with an overhead stirrer, thermocouple and condenser was added SILTECH E1316 (100 g) and MIBK (250 g). The solution was heated to 65° C.

An aqueous dispersion of the compound was then prepared. Water (782 g), CHEMIDEX S (2.2 g), ETHAL LA-4 (2.8 g), dipropylene glycol (24.6 g), and acetic acid (1.5 g) were added to a beaker and stirred to form a surfactant solution. The solution was heated to 65° C. The wax solution temperature was increased to 65 C and the surfactant solution was slowly added to produce a milky solution. The mixture was blended, homogenized at 6000 psi and the resulting emulsion was distilled under reduced pressure to remove the solvent. An additional 0.6 of CHEMIDEX S was dissolved at 65° C. after distillation to yield a non-flammable cationic dispersion at 12% solids after cooling and filtering.

COMPARATIVE EXAMPLE A

Untreated Fabric

Untreated (new) fabric samples were tested according to Test Methods 1 and 2.

TABLE 2

Performance of Comparative Example A

|  | Cotton | Polyester |
|---|---|---|
| Water Drop Rating | 0 | 0 |
| Spray Rating | 0 | 0 |

EXAMPLE 1

Performance of UD1 in Wash and Rinse Cycles

A KENMORE stackable washer/dryer with 26.5 L washer capacity was programmed for a small load and set to run a wash and rinse cycle with hot or cold water according to Table 3. UD1 (795.00 g) was mixed in a beaker with a wetting agent (INVADINE PBN, 132.0 g). The wash cycle was started by setting the dial to Heavy Duty Super and pulling the dial. The water was allowed to partially fill the wash basin, and the urethane dispersion mixture was charged into the wash basin. The wash basin was allowed to completely fill, yielding an aqueous solution having 30 g/L of urethane compound (solids). Fabric samples were charged into the wash basin, and the wash cycle was allowed to run to completion.

The fabric was placed into a KENMORE automatic dryer and dried on high for 40 minutes ($1^{st}$ Dry). Internal dryer temperature was measured during the $1^{st}$ Dry to be 60° C. The fabric was placed back into a KENMORE automatic dryer and dried on high for an additional 40 minutes ($2^{nd}$ Dry). Internal dryer temperature was measured during the $2^{nd}$ Dry to be 75° C. The fabric samples were allowed to sit for at least 2 hours and were then tested according to Test Methods 1 and 2.

TABLE 3

Performance of Example 1

|  | Hot Wash and Cold Rinse | | Cold Wash and Cold Rinse | |
|---|---|---|---|---|
|  | Cotton | Polyester | Cotton | Polyester |
| Water Drop Rating | | | | |
| $1^{st}$ Dry (New) | 3 | 3 | 3 | 3 |
| $2^{nd}$ Dry (New) | 3 | 3 | 3 | 3 |
| $1^{st}$ Dry (Pre-washed) | 3 | 3 | 3 | 3 |
| $2^{nd}$ Dry (Pre-washed) | 3 | 3 | 3 | 3 |
| Spray Rating | | | | |
| $1^{st}$ Dry (New) | 90 | 100 | 70 | 100 |
| $2^{nd}$ Dry (New) | 95 | 100 | 95 | 100 |
| $1^{st}$ Dry (Pre-washed) | 85 | 100 | 85 | 100 |
| $2^{nd}$ Dry (Pre-washed) | 100 | 100 | 90 | 95 |

The performance data of Table 3 demonstrates the efficacy of the inventive process to provide water repellency to a fabric when used during the wash cycle of a washing machine. Superior water repellency was achieved on both cotton and polyester fabrics, either new or pre-washed, using either hot or cold wash cycles.

EXAMPLE 2

Performance of UD1 in Rinse Cycle

Example 1 was repeated, except the KENMORE washer was programmed for a Heavy Duty Rinse cycle at warm or cold temperatures according to Table 4.

TABLE 4

Performance of Example 2

|  | Warm Rinse | | Cold Rinse | |
|---|---|---|---|---|
|  | Cotton | Polyester | Cotton | Polyester |
| Water Drop Rating | | | | |
| $1^{st}$ Dry (New) | 3 | 3 | 3 | 3 |
| $2^{nd}$ Dry (New) | 3 | 3 | 3 | 3 |
| $1^{st}$ Dry (Pre-washed) | 3 | 3 | 3 | 3 |
| $2^{nd}$ Dry (Pre-washed) | 3 | 3 | 3 | 3 |
| $1^{st}$ Dry (Pre-treated with UD1) | 4 | 4 | 4 | 4 |
| $1^{st}$ Dry (Pre-treated with CAPSTONE TC) | 5 | 7 | 8 | 7 |
| Spray Rating | | | | |
| $1^{st}$ Dry (New) | 90 | 100 | 100 | 100 |
| $2^{nd}$ Dry (New) | 95 | 100 | 100 | 100 |
| $1^{st}$ Dry (Pre-washed) | 80 | 90 | 100 | 100 |
| $2^{nd}$ Dry (Pre-washed) | 85 | 100 | 100 | 100 |
| $1^{st}$ Dry (Pre-treated with UD1) | 100 | 100 | 100 | 100 |
| $1^{st}$ Dry (Pre-treated with CAPSTONE TC) | 75 | 100 | 100 | 100 |

The performance data of Table 4 demonstrates the efficacy of the inventive process to provide water repellency to a fabric when used during the rinse cycle of a washing machine. Superior water repellency was achieved on both cotton and polyester fabrics, either new or pre-washed, using either hot or cold wash cycles. Additionally, the process was shown to increase the spray ratings of fabrics that had been pre-treated and washed, indicating that the process can be used to restore water repellency to worn treated fabrics.

EXAMPLE 3

Performance of UD2 in Wash Cycles with Detergent, and Rinse Cycles without Detergent A KENMORE stackable washer/dryer with 26.5 L washer capacity was programmed for a small load and set to run a wash/rinse or rinse cycle with hot or cold water according to Table 5. UD2 (1400.00 g) was mixed in a beaker with a wetting agent (INVADINE PBN, 132.0 g). The wash or rinse cycle was started by setting the dial to Heavy Duty Super (Wash) or Heavy Duty Rinse (Rinse), respectively, and pulling the dial. The water was allowed to partially fill the wash basin, and the urethane dispersion mixture was charged into the wash basin. The wash basin was allowed to completely fill, yielding an aqueous solution having 30 g/L of urethane compound (solids). For the wash cycles, 1993 AATCC Standard Reference Detergent WOB (19 g) was then added to the solution. Fabric samples were charged into the wash basin, and the wash cycle was allowed to run to completion.

The fabric was placed into a KENMORE automatic dryer and dried on high for 40 minutes (1st Dry). Internal dryer temperature was measured during the 1st Dry to be 60° C. The fabric was placed back into a KENMORE automatic dryer and dried on high for an additional 40 minutes (2nd Dry). Internal dryer temperature was measured during the 2nd Dry to be 75° C. The fabric samples were allowed to sit for at least 2 hours and were then tested according to Test Methods 1 and 2.

TABLE 5

Performance of Example 3

| | Hot Wash and Cold Rinse | | Cold Wash and Cold Rinse | | Cold Rinse | |
|---|---|---|---|---|---|---|
| | Cotton | Polyester | Cotton | Polyester | Cotton | Polyester |
| Water Drop Rating | | | | | | |
| 1st Dry (New) | 0 | 4 | 0 | 4 | 4 | 3 |
| 2nd Dry (New) | 1 | 4 | 0 | 4 | 4 | 3 |
| Spray Rating | | | | | | |
| 1st Dry (New) | 0 | 100 | 0 | 80 | 85 | 85 |
| 2nd Dry (New) | 25 | 100 | 0 | 85 | 85 | 85 |

The performance data of Table 5 demonstrates the efficacy of an anionic system to provide water repellency to a fabric when used in combination with a detergent or during the rinse cycle of a washing machine. When the treating agent was used in combination with a detergent during a wash cycle, the polyester fabric substrates exhibited superior water repellency. Additionally, the process was shown to increase the water repellency of both cotton and polyester fabrics when used during a rinse cycle without detergent.

EXAMPLE 4

Performance of UD3 in a Cold Rinse Cycle

A KENMORE stackable washer/dryer with 26.5 L washer capacity was programmed for a small load and set to run a rinse cycle with cold water. UD3 (760.00 g) was mixed in a beaker with a wetting agent (INVADINE PBN, 132.0 g). The wash cycle was started by setting the dial to Heavy Duty Rinse and pulling the dial. The water was allowed to partially fill the wash basin, and the urethane dispersion mixture was charged into the wash basin. The wash basin was allowed to completely fill, yielding an aqueous solution having 30 g/L of urethane compound (solids). Fabric samples were charged into the wash basin, and the wash cycle was allowed to run to completion.

The fabric was placed into a KENMORE automatic dryer and dried on high for 40 minutes (1st Dry). Internal dryer temperature was measured during the 1st Dry to be 60° C. The fabric was placed back into a KENMORE automatic dryer and dried on high for an additional 40 minutes (2nd Dry). Internal dryer temperature was measured during the 2nd Dry to be 75° C. The fabric samples were allowed to sit for at least 2 hours and were then tested according to Test Methods 1 and 2.

EXAMPLE 5

Performance of UD3/WD1 Blend in a Cold Rinse Cycle

Example 4 was repeated, except that both UD3 (608.00 g) and WD1 (520.00 g) were used.

EXAMPLE 6

Performance of UD3/WD2 Blend in a Cold Rinse Cycle

Example 4 was repeated, except that both UD3 (608.00 g) and WD2 (322.00 g) were used.

EXAMPLE 7

Performance of UD3/WD3 Blend in a Cold Rinse Cycle

Example 4 was repeated, except that both UD3 (608.00 g) and WD3 (314.00 g) were used.

TABLE 6

Performance of Examples 4-7

| | Ex. | | | | | | | |
|---|---|---|---|---|---|---|---|---|
| | 4 | | 5 | | 6 | | 7 | |
| | Cotton | Polyester | Cotton | Polyester | Cotton | Polyester | Cotton | Polyester |
| Water Drop Rating | | | | | | | | |
| 1st Dry (New) | 3 | 3 | 3 | 3 | 3 | 3 | 3 | 3 |
| Spray Rating | | | | | | | | |
| 1st Dry (New) | 80 | 90 | 85 | 100 | 70 | 100 | 90 | 100 |

The performance data of Table 6 demonstrates the efficacy of different blend compositions to provide water repellency to a fabric when used during the rinse cycle of a washing machine. The process, using varied treating compositions, was shown to provide excellent water repellency to both cotton and polyester fabrics.

EXAMPLE 8

Performance of UD4 in a Cold Rinse Cycle

Example 4 was repeated, except that UD4 (828.00 g) was used.

EXAMPLE 9

Performance of UD5 in a Cold Rinse Cycle

Example 4 was repeated, except that UD5 (792.00 g) was used.

EXAMPLE 10

Performance of UD6 in a Cold Rinse Cycle

Example 4 was repeated, except that UD6 (818.00 g) was used.

TABLE 7

| Performance of Examples 8-10 | | | | | |
|---|---|---|---|---|---|
| | Ex. | | | | |
| | 8 | | 9 | | 10 | |
| | Cotton | Polyester | Cotton | Polyester | Cotton | Polyester |
| Water Drop Rating | | | | | | |
| 1st Dry (New) | 3 | 3 | 0 | 1 | 3 | 3 |
| Spray Rating | | | | | | |
| 1st Dry (New) | 80 | 100 | 0 | 50 | 80 | 100 |

The performance data of Table 7 demonstrates the efficacy of different treating compositions to provide water repellency to a fabric when used during the rinse cycle of a washing machine. The process, using varied urethane compounds, was shown to provide excellent water repellency to fibrous substrates.

The compositions, methods, and substrates of the present invention are useful to provide excellent water repellency and optionally stain release to treated substrates by application in the home or small-scale environment. Because the method can be used to provide surface properties to treated or untreated fabrics, the consumer has the ability to enhance performance of a previously untreated substrate, or boost performance of a previously treated but worn substrate. The use of non-fluorinated organic urethane have been found to provide superior water repellency and durable water repellency compared to traditional non-fluorinated water repellents and are comparable to commercially available fluorinated water repellents. The treated substrates of the present invention are useful in a variety of applications and products such as clothing, bedding, protective garments, rugs, upholstery, furnishings, and other uses. The excellent surface properties described above help to maintain surface cleanliness and therefore can permit longer use.

What is claimed is:

1. A method of imparting water repellency and optionally stain release to fibrous substrates comprising contacting a fibrous substrate with a laundry treatment composition inside a laundry machine, wherein the laundry treatment composition comprises a hydrophobic compound having at least one linkage of Formula I:

—NHC(O)—X—     (I)

wherein

X is selected from Formulas (IIa) or (IIb):

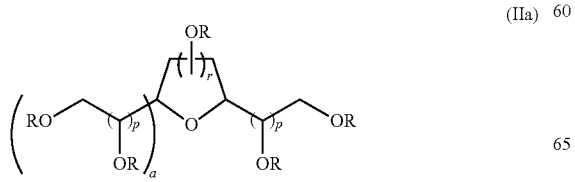
(IIa)

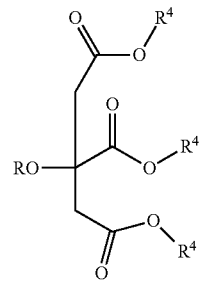
(IIb)

wherein each R is independently a direct bond to NHC(O) of Formula I; —H; —R$^1$; —C(O)R$^1$; —(CH$_2$CH$_2$O)$_n$(CH(CH$_3$)CH$_2$O)$_m$R$^2$;
or —(CH$_2$CH$_2$O)$_n$(CH(CH$_3$)CH$_2$O)$_m$C(O)R$^1$;

each n is independently 0 to 20;
each m is independently 0 to 20;
m+n is greater than 0;
r is 1 to 3;
a is 0 or 1;
p is independently 0 to 2;
provided that a is 0 when r is 3;
each R$^1$ is independently a linear or branched alkyl group having 5 to 29 carbons optionally comprising at least 1 unsaturated bond;
each R$^2$ is independently —H, a linear or branched alkyl group having 6 to 30 carbons optionally comprising at least 1 unsaturated bond;
or mixtures thereof,
provided when X is Formula (IIa), then at least one R is a direct bond to NHC(O) of Formula 1; and at least two R groups are a —R$^1$; —C(O)R$^1$; —(CH$_2$CH$_2$O)$_n$(CH(CH$_3$)$_m$R$^2$; or —(CH$_2$CH$_2$O)$_n$(CH(CH$_3$)CH$_2$O)$_m$C(O)R$^1$;
each R$^4$ is independently a direct bond to NHC(O) of Formula I; —H, a linear or branched alkyl group having 6 to 30 carbons optionally comprising at least 1 unsaturated bond, or combinations thereof;
—(CH$_2$CH$_2$O)$_n$(CH(CH$_3$)CH$_2$O)$_m$R$^2$; or
—(CH$_2$CH$_2$O)$_n$(CH(CH$_3$)CH$_2$O)$_m$C(O)R$^1$; and
provided when X is Formula (IIb), then at least one R or R$^4$ is a direct bond to NHC(O) of Formula 1; and at least two of R or R$^4$ are a linear or branched alkyl group optionally comprising at least 1 unsaturated bond, or combinations thereof; —(CH$_2$CH$_2$O)$_n$(CH(CH$_3$)CH$_2$O)$_m$R$^2$; or —(CH$_2$CH$_2$O)$_n$(CH(CH$_3$)CH$_2$O)$_m$C(O)R$^1$.

2. The method of claim 1 wherein X is 100% bio-based derived.

3. The method of claim 1, wherein the hydrophobic compound further comprises at least one moiety Q to form Formula (I'):

—Q—NHC(O)—X—     (I')

where Q is a monovalent, divalent, or polyvalent moiety selected from linear or branched, cyclic or acyclic, alkylene groups optionally containing at least one group selected from alkoxy, phenyl, siloxane, urethane, urea, biuret, uretdione, cyclized isocyanate, allophanate, or isocyanurate.

4. The method of claim 1, wherein the hydrophobic compound further comprises at least one linkage selected from Formulas (IVa), (IVb), (IVc), or mixtures thereof:

(IVa), $$R^{15}-(OCH_2CH(OR^{16})CH_2)_z-OR^{17} \quad \text{(IVb),}$$

$$-NH-C(O)-NH-X \quad \text{(IVc)}$$

wherein D is selected from —N($R^{12}$)—C(O)—NH—, —OC(O)NH—, —C(O)NH—, —SC(O)NH—, —O—(CH$_2$CH$_2$O)$_s$(CH(CH$_3$)CH$_2$O)$_t$—C(O)NH—, or —[C(O)]—O—(CH$_2$CH$_2$O)$_s$(CH(CH$_3$)CH$_2$O)$_t$—C(O)NH—;

X is defined as above;

$R^6$ is selected from a —C$_1$ to C$_{30}$ linear or branched alkyl optionally comprising at least one unsaturated group, a hydroxyl- or urethane-functional C$_1$ to C$_{30}$ linear or branched alkyl, a hydroxyl- or urethane-functional linear or branched C$_1$ to C$_{30}$ polyether, a hydroxyl- or urethane-functional linear or branched polyester having a polyester polymer backbone, a hydroxyl- or urethane-functional linear or branched organosiloxane, an amine- or urea-functional linear or branched organosiloxane, a thiol- or thiocarbonate functional C$_1$ to C$_{30}$ linear or branched alkyl, an amine- or urea-functional C$_1$ to C$_{30}$ linear or branched alkyl,

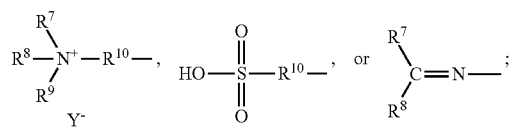

wherein $R^7$, $R^8$, and $R^9$ are each independently, —H, —C$_1$ to C$_6$ alkyl, or combinations thereof;

$R^{10}$ is a divalent alkyl group of 1 to 20 carbons;

$R^{12}$ is —H or a monovalent C$_1$ to C$_6$ alkyl group;

$R^{15}$, $R^{16}$, and $R^{17}$ are each independently a —H; —C(O)NH—; —$R^{18}$; —C(O)$R^{18}$ provided that at least one $R^{15}$, $R^{16}$, or $R^{17}$ is a —C(O)NH—;

$R^{18}$ is independently a linear or branched alkyl group having 5 to 29 carbons optionally comprising at least 1 unsaturated bond;

z is 1 to 15;

Y is Cl;

s is an integer of 0 to 50;

t is an integer of 0 to 50; and s+t is greater than 0.

5. The method of claim 1 wherein X is selected from Formula (IIa) to be Formula (IIa'):

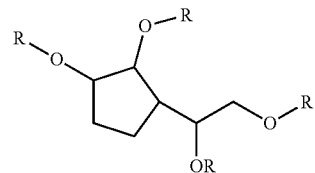

wherein R is further limited to independently a direct bond to NHC(O), —H; —$R^1$; or —C(O)$R^1$.

6. The method of claim 1 wherein X is selected from Formula (IIa) to be Formula (IIa'):

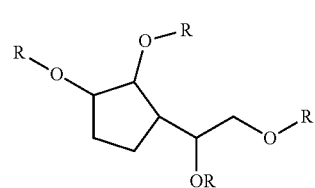

wherein R is further limited to independently a direct bond to NHC(O), —H; —(CH$_2$CH$_2$O)$_n$(CH(CH$_3$)CH$_2$O)$_m$$R^2$; or —(CH$_2$CH$_2$O)$_n$(CH(CH$_3$)CH$_2$O)$_m$C(O)$R^1$.

7. The method of claim 1 wherein X is selected from Formula (IIb).

8. The method of claim 1, where the laundry treatment composition further comprises a wax.

9. The method of claim 8, where the wax is selected from beeswax; microcrystalline wax; oxidized microcrystalline wax; paraffin wax; montan wax; ozokerite wax; carnauba wax; candililla wax; palm wax; whale wax; lanolin; sugar cane wax; sugar esters; polyolefin wax; mono-, di, or tri-glyceride esters; fatty acid ester waxes; or blends thereof.

10. The method of claim 1 wherein the contacting step occurs during a laundry machine wash cycle or rinse cycle.

11. The method of claim 1 wherein the fibrous substrate is contacted prior to starting a laundry machine wash cycle or rinse cycle.

12. The method of claim 1 further comprising a step of curing the hydrophobic compound with heat.

13. The method of claim 12, where the step of curing is completed by machine drying in a dryer, ironing, steaming, blow drying, drying under a heat lamp, or drying near a radiative source of heat.

14. A substrate treated according to the method of claim 1.

* * * * *